(No Model.)
T. H. HICKS.
DEVICE FOR MEASURING ELECTRICAL CURRENTS.
No. 426,499. Patented Apr. 29, 1890.
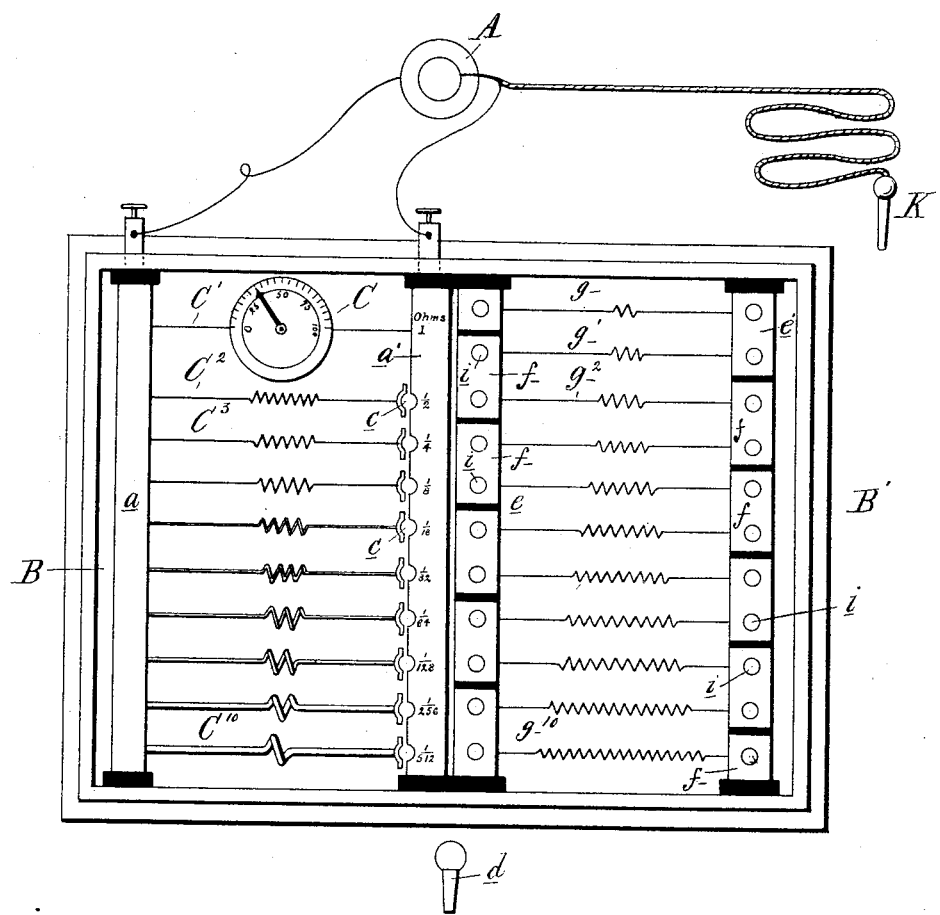
Witnesses:
P. M. Hulbert
E. A. McBrearty
Inventor:
Thomas H. Hicks
By James Whittemore
Att'y.

UNITED STATES PATENT OFFICE.

THOMAS H. HICKS, OF DETROIT, MICHIGAN, ASSIGNOR TO THE ELECTRICAL INVENTION COMPANY, OF SAME PLACE.

DEVICE FOR MEASURING ELECTRICAL CURRENTS.

SPECIFICATION forming part of Letters Patent No. 426,499, dated April 29, 1890.

Application filed September 9, 1889. Serial No. 323,462. (No model.)

*To all whom it may concern:*

Be it known that I, THOMAS H. HICKS, a citizen of Great Britain, residing at Detroit, in the county of Wayne and State of Michigan, have invented certain new and useful Improvements in Devices for Measuring Electrical Currents, of which the following is a specification, reference being had therein to the accompanying drawing.

This invention relates to new and useful improvements in devices for measuring electrical currents; and the object of the invention is to do away with the multiplicity of apparatus now required and combine in a single device all the elements necessary to measure any kind of electrical currents— that is, to ascertain, either by direct reading or with but a trifling calculation, its quantity or electro-motive force, or to determine the resistance of any conductor as expressed by the usual standards or units now currently adapted.

To this end my invention consists in the peculiar construction, arrangement, and combination of different parts, all as more fully hereinafter described, and shown in the accompanying drawing, illustrating my invention in diagram, and in which—

A is the source or generator of the electrical current which it is desired to measure.

B and B' are two resistance-boxes of peculiar construction.

The resistance-box B substantially consists of the two metal bars $a\ a'$, the resistance of which is so small that it may be neglected, and of the graduated resistances $C'\ C''\ C^3$, &c., inserted in multiple between the bars $a\ a'$, one end of each bar being permanently secured to the bar $a$, while the other end is normally disconnected, but adapted to be electrically connected to the other bar $a'$ by a suitable electrical bridge such as shown in the drawing, where $c$ are sockets formed between the adjoining ends of the resistances and the bar $a'$, and into which ordinary jacks— such as shown at $d$—may be inserted. The resistances $C'\ C''$, &c., are comparatively small, the highest being preferably made equal to the unit and the others to fractions thereof arranged on a gradually-descending scale, each resistance being preferably chosen one-half of the one above it. The differences in the resistances $C'\ C''\ C^3$, &c., are preferably obtained by a gradual increase in the size of the conductor, and of course each resistance must be carefully adjusted to its extended value before it is embodied in the device. The bars $a\ a'$ are preferably provided with suitable binding-posts and supported on an insulating bed or frame in fixed relation to each other.

C is a measuring-instrument of any known construction, such as in use for measuring the quantity of a current as expressed by a fixed unit, such as the ampère. This instrument is preferably included in the unit-resistance $C'$, and should be sensitive and have a capacity for indicating one whole unit or any fraction thereof in hundredths.

The resistance-box B' consists of two parallel bars $e\ e'$, carrying metal plates $f$, which are insulated from each other, and which are preferably of a size and material to form conductors of such small resistance that they form no factor as such. To these bars are secured a series of conductors $g\ g'\ g''$, &c., of graduated resistances, preferably from two units upward, increasing in a certain fixed ratio—as, for instance, by doubling the resistance in the next following conductor. Each metal plate $f$ has the ends of two resistances secured to it; but by breaking the insulating-joints between the plates on the two bars alternately the conductors $g\ g'\ g''$, &c., are all connected in series with each other, and, if desired, may be permanently connected in series with the bar $a'$; but I prefer that each conductor may be used for itself by providing suitable binding posts or sockets for metal plugs in each of the plates $f$. In the drawing sockets $i$ are shown, two on each plate, although one socket in each plate would be sufficient. With two sockets, however, the conductors are more easily selected.

In practice, the parts being arranged substantially as shown and described, they are intended to operate as follows: To find, for instance, the strength of a current as expressed in ampères, the opposite terminals of the electric source are secured to the binding-posts of the bars $a\ a'$ and all the resistances $C'\ C''$, &c., are placed in multiple electrical connection with the bars $a$ $a'$ by means of plugs $d$ in the sockets $c$. If the instrument C is then consulted and it is found that no reading is obtained, then one resistance after another is cut out, beginning with the lowest resistance, until the highest possible reading is obtained on the instrument C. This reading gives only the value of that portion of the current flowing through the conductor $C'$ and the instrument C, (the combined resistance of which is equal to the unit,) and in order to find from this the true value of the whole current the reading obtained on the instrument must be multiplied by the sum of all the other resistances through which a portion of the current has been diverted. To find the electro-motive force as expressed in volts, that terminal of the electric source which is connected to the bar $a'$ is disconnected and provided with a suitable plug K, which is then inserted into the last socket of the resistances $g^{10}$, and electrical connection is made between the resistance $g$ and the bar $a$ by bridging, in any suitable manner, between the bar $a'$ and the adjoining plate $f$, to which the resistance $g$ is connected. By connecting in this manner it will be seen that all the resistances $g$ $g'$, &c., are in series with the instrument C, and if no reading is obtained it means there is too much resistance, and I therefore reduce it by cutting out resistances one after another (by use of the plug K) until I obtain a good reading on the instrument. Now, in accordance with the formula $C=E/R$, in which C is the factor obtained by the instrument, E is the electro-motive force to be ascertained, and R the resistance represented by the sum of the resistances of the remaining conductors, the electro-motive force $E=C \times R$, and by substituting for C and R the values found the electro-motive force is easily ascertained.

My device may be obviously also used for measuring any unknown resistance. This is easily done by finding an equivalent resistance on the resistance-box B', where all the resistances are known, or by calculating it in accordance with the rule that the resistance is equal to the electro-motive force divided by the current, which last two factors can be easily ascertained.

If my device is constructed with necessary accuracy and care, it will, in the hands of a practical electrician, not only furnish entirely satisfactory results, but it will save him the cost of a large number of instruments at present required to measure all the different kinds of currents met with in the practical application of electricity.

I have preferably shown my device in diagram to better illustrate its principle in constructing it for practical use and sale. I shall avail myself of the ordinary skill in constructing such instruments to make it of most convenient form and handsome appearance, and to this end the construction may be obviously altered to obtain a more perfect device or better and more compact form without departing from the principle on which it is constructed.

What I claim as my invention is—

1. In a device for measuring electrical currents, the combination of the current-unit-measuring device, the unit-resistance in which it is included, the series of graduated resistances in shunt-circuits therewith and representing fractions of the units of resistance, and the series of graduated resistances forming multiples of the unit of resistance and connected together in series with each other and the current-unit device, substantially as described.

2. In a device for measuring electrical currents, the combination of a resistance-box consisting of a graduated series of known resistances in shunt-circuits, with a conductor representing the unit of resistance and including a suitable measuring device for ascertaining the quantity of a current passing through it, and a second resistance-box, consisting of a graduated series of known resistances in series with each other, substantially as described.

3. In a device for measuring electrical currents, the combination, with a current-unit-measuring device, and the unit-resistance conductor in which it is included, of a graduated series of known resistances in open shunt-circuits with said conductor and measuring device, and another graduated series of known resistances in series with said unit-resistance conductor and its measuring devices, the shunt-resistances forming fractions of the unit and the series resistances forming multiples thereof, all substantially as described.

4. In a device for measuring electrical currents, the combination of the resistance-box B, consisting of the bars $a$ $a'$, the instrument C, the unit-conductor $C'$, in which it is included, the graduated series of known resistances $C'$ $C''$, &c., adapted to shunt a portion of the current through any one of said resistances, the graduated series of known resistances $g$ $g'$ $g''$, &c., and the plates $f$, to which they are secured in series with each other, substantially as described.

5. In a device for measuring electrical currents, the combination of the resistance-box consisting of a graduated series of known resistances, a conductor representing the unit of resistance, an indicator with which said unit-conductor is connected, and a detachable connection between the graduated resistances, substantially as described.

In testimony whereof I affix my signature, in presence of two witnesses, this 31st day of September, 1889.

THOMAS H. HICKS.

Witnesses:
ED. R. SOLEAN,
ED. McBREARTY.